(12) United States Patent
Pu et al.

(10) Patent No.: US 11,644,727 B2
(45) Date of Patent: May 9, 2023

(54) DISPLAY PANEL, MANUFACTURING METHOD OF THE DISPLAY PANEL, AND DISPLAY DEVICE

(71) Applicants: Beihai HKC Optoelectronics Technology Co., Ltd., Beihai (CN); HKC Corporation Limited, Shenzhen (CN)

(72) Inventors: Yang Pu, Beihai (CN); WenChin Hung, Beihai (CN); Wei Li, Beihai (CN)

(73) Assignees: Beihai HKC Optoelectronics Technology Co., Ltd., Beihai (CN); HKC CORPORATION LIMITED, Shenzhen (CN)

( * ) Notice: Subject to any disclaimer, the term of this patent is extended or adjusted under 35 U.S.C. 154(b) by 43 days.

(21) Appl. No.: 17/238,155

(22) Filed: Apr. 22, 2021

(65) Prior Publication Data

US 2022/0035214 A1  Feb. 3, 2022

(30) Foreign Application Priority Data

Jul. 29, 2020  (CN) .......................... 202010742525.8

(51) Int. Cl.
  *G02F 1/1362*  (2006.01)
  *G02B 5/28*  (2006.01)
  *G02F 1/1343*  (2006.01)
  *G02F 1/1335*  (2006.01)

(52) U.S. Cl.
  CPC ....... *G02F 1/136295* (2021.01); *G02B 5/286* (2013.01); *G02F 1/133514* (2013.01); *G02F 1/134318* (2021.01); *G02F 1/133516* (2013.01)

(58) Field of Classification Search
  CPC ......... G02F 1/133514; G02F 1/133516; G02F 1/134318; G02F 1/133707
  See application file for complete search history.

(56) References Cited

U.S. PATENT DOCUMENTS

| 2005/0052391 A1* | 3/2005 | Yamazaki ......... G02F 1/136227 345/92 |
| 2006/0238694 A1* | 10/2006 | Chen ................... G02F 1/13394 349/156 |
| 2007/0004071 A1* | 1/2007 | Lee ................... G02F 1/134336 438/30 |
| 2007/0211200 A1* | 9/2007 | Lee ................... G02F 1/134336 349/139 |
| 2009/0096978 A1* | 4/2009 | Kim .................. G02F 1/134309 349/144 |
| 2009/0284695 A1* | 11/2009 | Kim .................. G02F 1/133514 349/155 |

(Continued)

FOREIGN PATENT DOCUMENTS

| CN | 1779540 A |  | 5/2006 |  |
| CN | 106324933 A | * | 1/2017 | ....... G02F 1/133514 |

*Primary Examiner* — Alexander P Gross (57) ABSTRACT

A display panel, a manufacturing method of the display panel, and a display device are disclosed. The display panel includes a first substrate and a second substrate. The first substrate includes a first base, a light-shielding layer disposed on the first base, and a color filter layer disposed on the first base, and a common electrode layer disposed on the light-shielding layer and the color filter layer. The common electrode layer is provided with an opening at a position opposite to the color filter layer.

8 Claims, 4 Drawing Sheets

(56) References Cited

U.S. PATENT DOCUMENTS

2017/0176823 A1\* 6/2017 Akiyoshi .......... G02F 1/134363
2019/0363110 A1\* 11/2019 Ha ........................ G02F 1/1368
2021/0255509 A1\* 8/2021 Ina ...................... G02F 1/13712

\* cited by examiner

DISPLAY PANEL, MANUFACTURING METHOD OF THE DISPLAY PANEL, AND DISPLAY DEVICE

The present application claims priority to the Chinese Patent Application No. 202010742525.8, filed Jul. 29, 2020, which is hereby incorporated by reference herein as if set forth in its entirety.

TECHNICAL FIELD

This application relates to the field of display technology, and more particularly relates to a display panel, a manufacturing method of the display panel, and a display device.

BACKGROUND

The statements herein merely provide background information related to the present application but don't necessarily constitute the prior art.

As science and technology continue to develop and progress, display panels have gradually penetrated into people's lives, changing the way people communicate. A display panel includes a first substrate and a second substrate. The first substrate includes a first base, a light-shielding layer provided on the first base, a color filter layer provided on the first base, and a common electrode layer provided on the first base and the color filter layer.

In the manufacturing process of the first substrate, the process of forming the common electrode layer requires high-temperature annealing. In a display panel thus manufactured, however, bubbles may form in the liquid crystal layer during use of the finished product, resulting in abnormal display of the display panel.

SUMMARY

It is therefore an objective of this application to provide a display panel, a manufacturing method of the display panel, and a display device, which can avoid the formation of bubbles in the liquid crystal layer thereby improving the display effect of the display panel.

The present application discloses a display panel that includes a first substrate and a second substrate that is disposed opposite to the first substrate. The first substrate includes a first base, a light-shielding layer provided on the first base, a color filter layer provided on the first base, and a common electrode layer provided on the light-shielding layer and the color filter layer. The common electrode layer is provided with an opening at a position opposite to the color filter layer.

This application further discloses a manufacturing method of a display panel, including:

- sequentially forming a light-shielding layer, a color filter layer, and a common electrode layer on a first base to form a first substrate; and
- aligning and fitting the first substrate with a second substrate;
- where in forming the common electrode layer on the first base, the common electrode layer is etched at a position opposite to the color filter layer using a photo mask to create an opening.

This application further provides a display device that includes a display panel. The display panel includes a first substrate and a second substrate disposed opposite to the first substrate. The first substrate includes a first base, a light-shielding layer provided on the first base, a color filter layer provided on the first base, and a common electrode layer provided on the light-shielding layer and the color filter layer. The common electrode layer is provided with an opening at a position opposite to the color filter layer.

In the process of forming the common electrode layer in this application, an opening is provided in the common electrode layer at a position opposite to the color filter layer. Thus, when the common electrode layer is being formed, the gas and water vapor produced by the color filter layer may pass through the opening and be released immediately, and thus may not easily to accumulate between the common electrode layer and the color filter layer. Note, because the gas and water vapor are created by the decomposition of the color filter layer, the common electrode layer is laid and attached to the color filter layer, and the opening in the common electrode layer is provided at the position opposite to the color filter layer, the gas and water vapor can be effectively released through this opening.

BRIEF DESCRIPTION OF DRAWINGS

The drawings included herein are intended to provide a further understanding of the embodiments of the present application. They constitute a part of the specification, and are used to illustrate the embodiments of the present application, and explain the principle of the present application in conjunction with the specification. Apparently, the drawings in the following description merely represent some embodiments of the present disclosure, and for those having ordinary skill in the art, other drawings may also be obtained based on these drawings without investing creative efforts. In the drawings.

DETAILED DESCRIPTION OF EMBODIMENTS

It will be appreciated that the terminology used, and the specific structure and function details disclosed herein are intended for mere purposes of illustrating specific embodiments and are representative. This application, however, maybe implemented in many alternative forms and thus is not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple" or "a plurality of" means two or more. Terms "including", "comprising", and any variations thereof are intended for non-exclusive inclusion, meaning that there may exist or be added one or more other features, integers, steps, operations, units, components, and/or combinations thereof.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms should not be construed as restricting the present disclosure.

Furthermore, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood on a case-by-case basis.

Hereinafter, the improvement of the above-mentioned defect by this application will be described in detail with reference to the drawings and some illustrative embodiments.

As science and technology continue to develop and progress, display panels have gradually penetrated into people's lives, changing the way people communicate. The display panel includes a first substrate 100 and a second substrate 200. The first substrate 100 includes a first base 110, a light-shielding layer 120 disposed on the first base 110, a color filter layer 130 disposed on the first base 110, and a common electrode layer 140 disposed on the first base 110 and the color filter layer 130. In the manufacturing process of the first substrate 100, the process of forming the common electrode layer 140 requires high-temperature annealing. In a display panel thus manufactured, however, bubbles may form in the liquid crystal layer during use of the finished product, resulting in abnormal display of the display panel.

Figure 1:
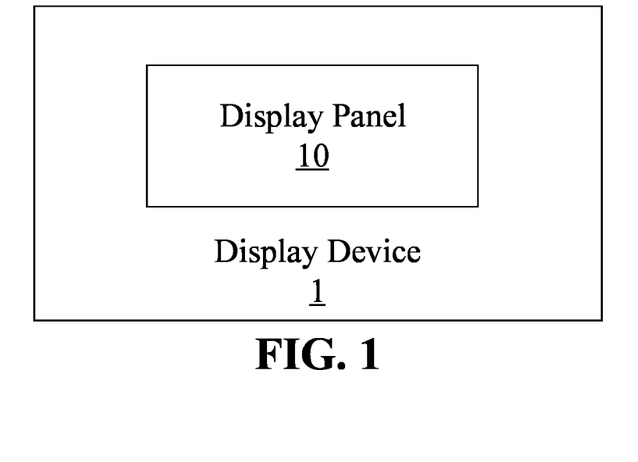
FIG. 1 is a schematic diagram of a display device according to an embodiment of the present application.
Figure 2:
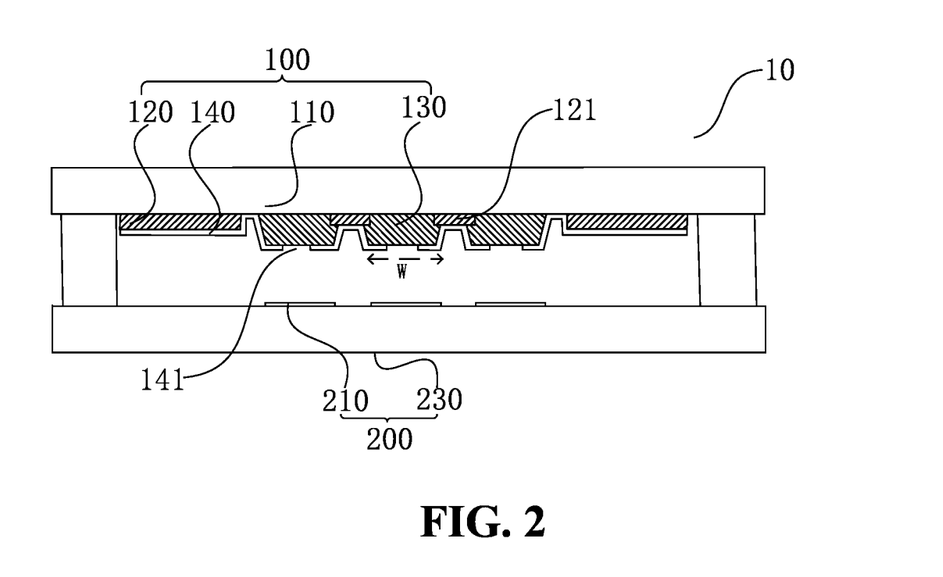
FIG. 2 is a schematic diagram illustrating the position of an opening according to an embodiment of the present application.

As an embodiment of the present application, a display device is disclosed in the schematic diagram of a display device shown in FIG. 1 and the schematic diagram of a display panel shown in FIG. 2, in order to improve the above-mentioned problem. The display device 1 includes a display panel 10. The display panel 10 includes a first substrate 100 and a second substrate 200 disposed opposite to the first substrate 100. The first substrate 100 includes a first base 110, a light-shielding layer 120 disposed on the first base 110, a color filter layer 130 disposed on the first base 110, and a common electrode layer 140 disposed on the light-shielding layer 120 and the color filter layer 130. The common electrode layer 140 is provided with an opening 141 at a position opposite to the color filter layer 130.

The first substrate 100 may be a CF substrate (color filter substrate), and the second substrate 200 may be an array substrate. The light-shielding layer 120 may be a black matrix, which is arranged in a display area 150 of the color filter substrate, and serving a light-shielding effect between two adjacent pixel areas. The light-shielding layer 120 may also be disposed in a non-display area 160 of the first substrate 100 to avoid light leakage at the edge of the display panel. The color filter layer 130 is disposed in the display area 150 and the non-display area 160 of the color filter substrate. The light-shielding layer 120 in the non-display area 160 is provided as a whole sheet. A plurality of the light-shielding layers 120 in the display area 150 may be arranged at intervals, and there is a spacing between the light-shielding layers 120 for arranging the color filter layer 130. To simplify the manufacturing process, the color filter layer 130 may be elongated, arranged along the data line direction of the display panel, running across the display area 150 and the non-display area 160, and arranged at intervals. In the non-display area 160, the color filter layer 130 and the light-shielding layer 120 may overlap. In the display area 150, the color filter layer 130 is disposed at the interval between the light-shielding layers 120, and the color filter layer 130 overlaps with each of the light-shielding layers 120 at their junction, thus guaranteeing the light-shielding effect of the light-shielding layers 120 in the display area 150. The common electrode layer 140 may be a film layer made of indium tin oxide (ITO), and has a thickness that lies in the range of 80 nm to 180 nm.

In the manufacturing process of the color filter substrate, the process of forming the common electrode layer 140 requires high-temperature annealing. At high temperatures, the color filter layer 130 underlying the common electrode layer 140 would often decompose and generate gases (such as carbon dioxide, nitrogen, methane, etc.) and water vapor because it is made of organic materials. Because the common electrode layer 140 is laid and attached onto the color filter layer 130 and the light-shielding layer 120 as a whole layer, these gases and water vapor are blocked by the common electrode layer 140 and cannot be effectively released immediately in the process of forming the common electrode layer 140. As time goes by in later stages, these gases and water vapor may gradually penetrate the common electrode layer 140 to enter the liquid crystal layer of the display panel 10 to form various undesirable bubbles, resulting in abnormal display of the display panel 10.

In the process of forming the common electrode layer 140 in the present application, an opening 141 is provided in the common electrode layer 140 at a position opposite to the color filter layer 130. Thus, when the common electrode layer 140 is being formed, the gas and water vapor produced by the color filter layer 130 may be released immediately through the opening 141 and so are not easy to accumulate between the common electrode layer 140 and the color filter layer 130. It is worth noting that, because the gas and water vapor are generated by the decomposition of the color filter layer 130, while the common electrode layer 140 is laid and attached to the color filter layer 130, and the opening 141 in the common electrode layer 140 is provided at the position opposite to the color filter layer 130, the gas and water vapor can be effectively released through the opening 141.

The opening 141 may be provided in the common electrode layer 140 at a position corresponding to the top of the color filter layer 130. The common electrode layer 140 needs to create an electric field with the pixel electrodes of the array substrate in order to control the deflection of the liquid crystals in the liquid crystal layer of the display panel 10. Thus, as a high-precision device, if the opening 141 provided in the common electrode is too large, it may have a certain impact on the electric field, thus having a certain impact on the deflection of the liquid crystal. On the other hand, if the opening 141 is too small, it will not be able to obtain a desirable effect of releasing gas and water vapor.

Therefore, to make the quality of the display panel 10 more superior, the size of the opening 141 needs to be accurately controlled when etching the opening 141. Due to the factor of the manufacturing process, the color filter layer 130 is substantially narrow in top and wide in bottom, with a trapezoidal cross-section, where the top of the color filter layer 130 is relatively flat. The opening 141 may be provided at a position corresponding to the top of the color filter layer 130. As such, the size of the opening 141 can be made accurate when etching the opening 141, so that the size of the opening 141 may not easily fall short of the desirable requirements due to topography issues, which may otherwise affect the display effect.

The opening 141 may be provided in the common electrode layer 140 and corresponds to the middle position in the width direction of the top of the color filter layer 130. As illustrated in FIG. 2, the width of the top of the color filter layer 130 is indicated by the arrows W shown in the figure, and the middle position in the width of the top of the color filter layer may be, for example, the area extending from one-third point to two-thirds point of the width of the top of the color filter layer 130. As mentioned above, due to the factor of the manufacturing process, the color filter layer 130 is substantially narrow in top and wide in the bottom, with a trapezoidal cross section. The opening 141 is provided at the position corresponding to area extending from the one-third point to the two-thirds point of the width of the top of the color filter layer 130, and one-third of the width is left on each of both sides of the opening 141, thereby ensuring that the opening 141 will still be disposed at a position corresponding to the top of the color filter layer 130 in cases where a certain etching error is present. This reduces the chance that the opening 141 is etched at the position corresponding to the side area between the top and the bottom of the color filter layer 130 due to errors. The side area between the top and the bottom of the color filter layer 130 is very uneven, and it is likely that the size of the opening 141 may not meet the desirable requirements due to the issue of the topography.

Figure 3:
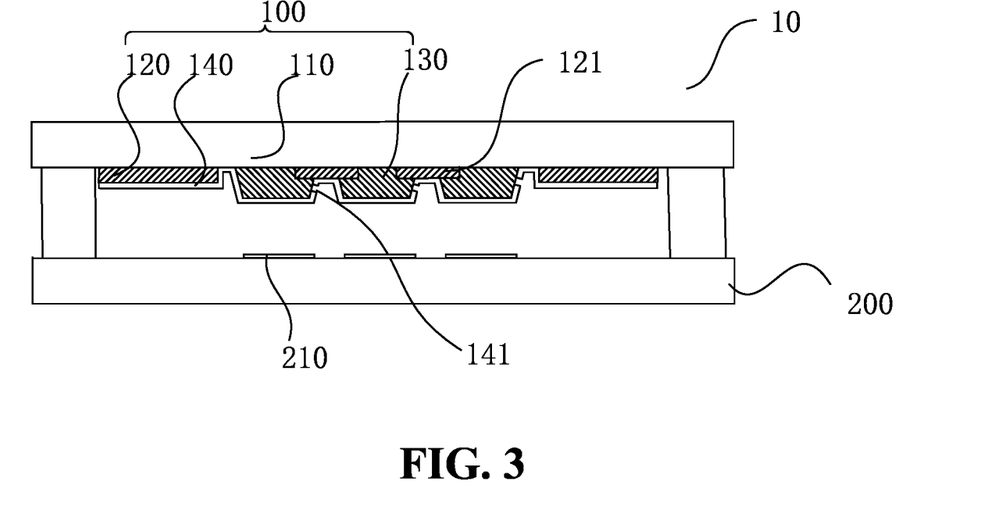
FIG. 3 is a schematic diagram illustrating the position of an opening according to another embodiment of the present application.

As illustrated in FIG. 3, the opening may alternatively or additionally be provided on the side of the color filter or, which may have a less impact on the electric field of the male electrode, making it beneficial to increase the aperture ratio of the display panel.

Figure 4:
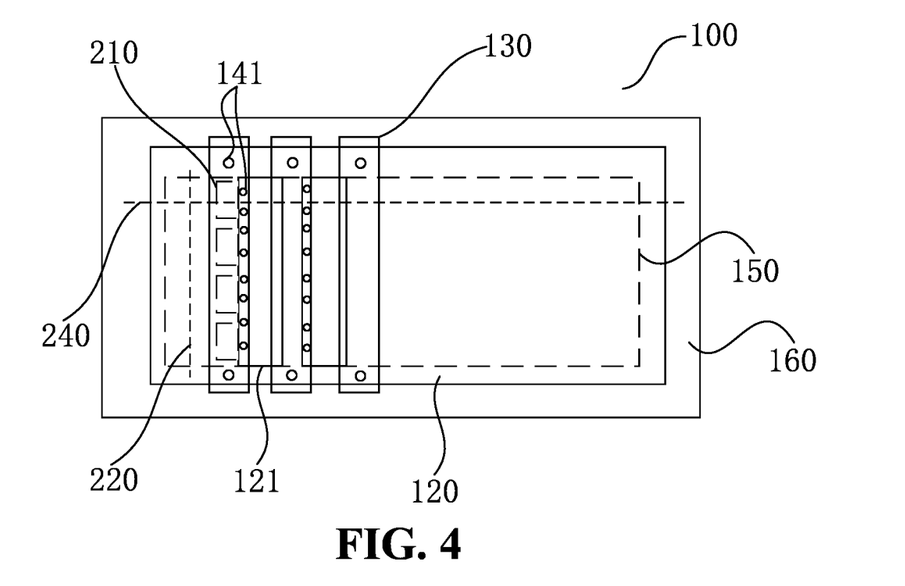
FIG. 4 is a top view of a display panel according to an embodiment of the present application.

As illustrated in FIG. 4, there is shown a top view of the first substrate 100. The first substrate 100 may further include a display area 150 and a non-display area 160, and the opening 141 is provided in the common electrode layer 140 at the non-display area 160 at a position corresponding to the overlapping area between the light-shielding layer 120 and the color filter layer 130. Because both the color filter layer 130 and the light-shielding layer 120 are formed by being first laid on the entire first substrate 110 and then the required shape is etched according to actual needs, there is an overlapping area between the light-shielding layer 120 and the color filter layer 130 in the non-display area 160. The opening 141 is arranged at a position corresponding to the overlapping area between the light-shielding layer 120 and the color filter layer 130. Thus, the opening 141 lies in the non-display area 160, and is also shielded by the light-shielding layer 120, thereby avoiding the potential problem that the opening 141 may affect the electric field due to etching errors and in turn affects the deflection of the liquid crystals. As such, the display effect of the display panel 10 is improved.

Figure 5:
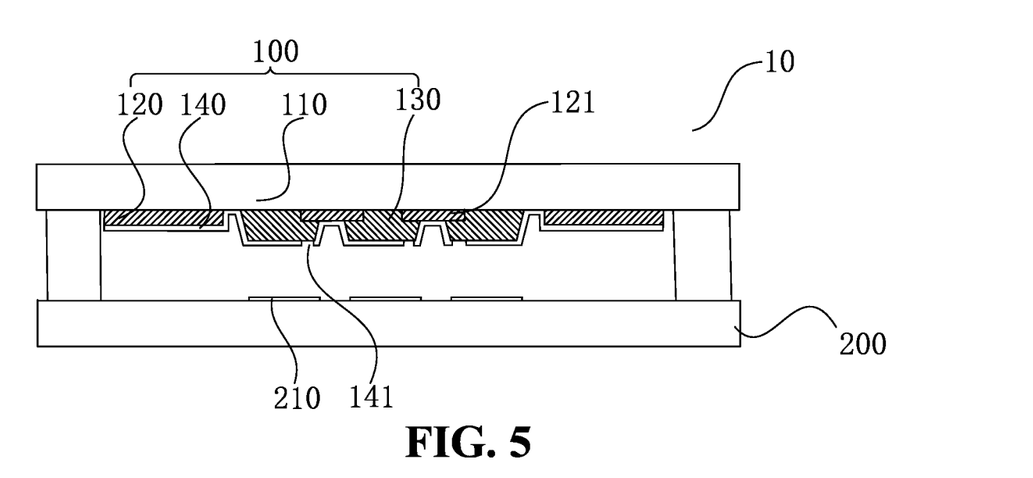
FIG. 5 is a schematic diagram of a display device according to another embodiment of the present application.

In addition, in connection with the schematic diagrams of the display panels illustrated in FIG. 4 and FIG. 5, the light-shielding layer 120 may further include a black matrix 121 disposed in the display area, and apart from being provided in the common electrode layer 140 in the non-display area 160 at the position corresponding to the overlapping area of the light-shielding layer 120 and the color filter layer 130, the opening 141 may alternatively or additionally be provided in the common electrode layer 140 in the display area 150 at a position corresponding to the overlapping area of the black matrix 121 and the color filter layer 130. In the display area 150, in order to guarantee the light-shielding effect of the black matrix 121, the black matrix 121 and the color filter layer 130 may have a certain overlapping area at their junction. The opening 141 is provided in the common electrode layer 140 in the display area 150, and at a position corresponding to the overlapping area of the black matrix 121 and the color filter layer 130. As such, if the opening 141 affects the electric field due to an etching error thus causing abnormal display, it is not easily visible to the user because it is blocked by the black matrix 121. Thus, the display effect of the display panel 10 will not be affected.

Figure 6:
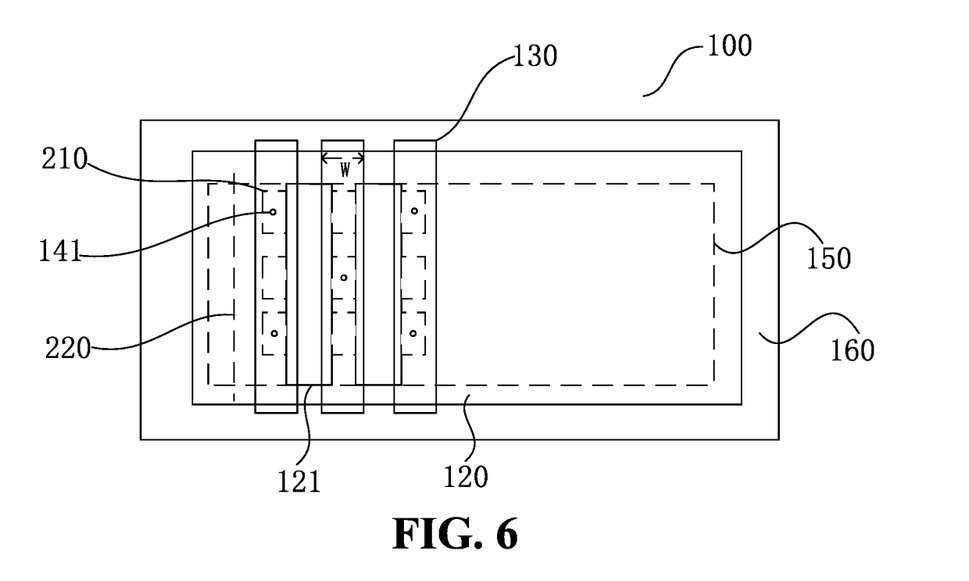
FIG. 6 is another top view of a display panel according to yet another embodiment of the present application.
Figure 7:
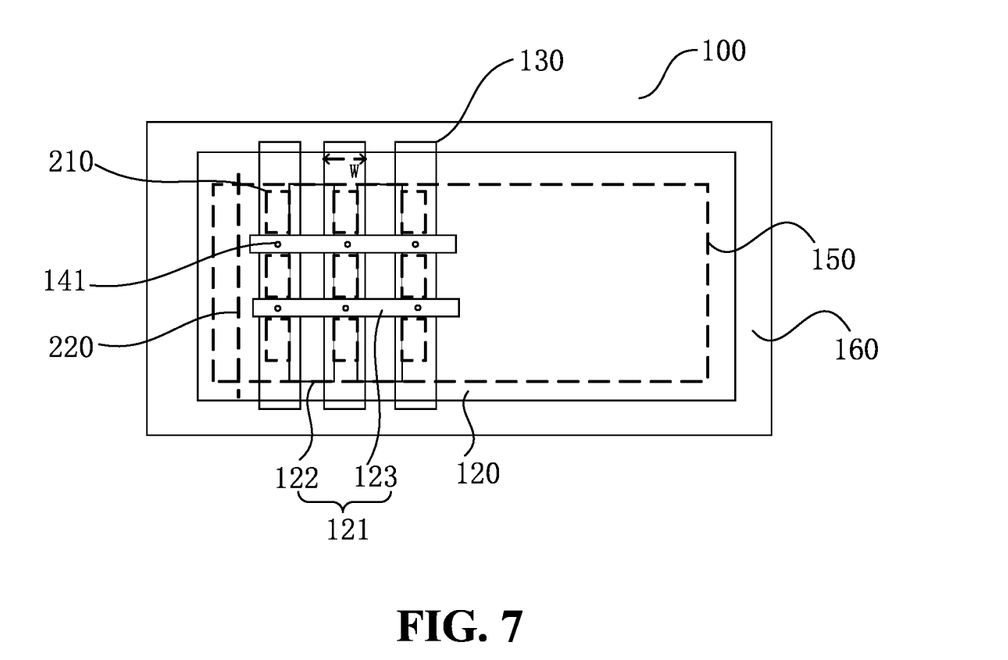
FIG. 7 is another top view of a display panel according to still another embodiment of the present application.

In particular, the second substrate 200 may include a scan line 240 and a data line 220, and the black matrix 121 may include a first light-shielding strip 122 extending along the direction of the data line 220 and a second light-shielding strip 123 extending along the direction of the scan line 240. Referring to FIG. 6, the position of the opening 141 may correspond to the overlapping area of the first light-shielding strip 122 and the color filter layer 130. Additionally or alternatively, referring to FIG. 7, the position of the opening 141 may correspond to the overlapping area of the second light-shielding strip 123 and the color filter layer 130 in the direction of the scan line 240. Of course, it is also feasible that the opening 141 is provided in the overlapping areas of both the first light-shielding strip 122 and the second light-shielding strip 123 with the color filter layer 130.

As illustrated in another top view of the first substrate 100 in FIG. 6, the second substrate 200 includes a plurality of pixel electrodes 210 corresponding to the color filter layer, and a plurality of the openings 141 are provided at intervals corresponding to the pixel electrodes 210, namely of every two adjacent pixel electrodes the opening is provided at a position corresponding to only one of the pixel electrodes. The openings 141 are on the whole distributed at equal intervals, thus providing an overall superior effect of releasing gas and water vapor. Meanwhile, in case the opening 141 affects the electric field due to the etching error thus causing abnormal display, it is not easy to make the display abnormality more obvious because the openings 141 are arranged too densely.

The opening 141 may be circular in shape, and has a radius that lies in the range of 3 to 10 microns. The radius of the opening 141 is 3 to 10 microns, and the area of the opening 141 is approximately 28.3 to 314 square microns. Having a size that lies within this range, the opening 141 may not easily affect the electric field, while guaranteeing the effect of releasing water vapor and gas. More particularly, the radius of the opening 141 may be 5 micrometers, and in this case the area of the opening 141 is about 78.5 square micrometers, which would lead to the good effect of balancing the releasing of water vapor and gas with the impact on the electric field.

Of course, the opening 141 may also have other shapes. For example, the opening 141 may have rectangular shape, and the area of the opening 141 may also be approximately 28.3-314 square microns. Having a size that lies within this range, the opening 141 may not easily affect the electric field, while guaranteeing the effect of releasing water vapor and gas. More particularly, the radius of the opening 141 may be 5 micrometers, while the area of the opening 141 is about 78.5 square micrometers, which would lead to the good effect of balancing the releasing of water vapor and gas with the impact on the electric field.

As another embodiment of the present application, a display panel is further disclosed. The display panel 10 includes a first substrate 100 and a second substrate 200 arranged aligned and fitted with the first substrate 100. A display area 150 of the first substrate 100 includes a first base 110, a black matrix 121 and a color filter layer 130 disposed on the first substrate 110, and a common electrode layer 140 disposed on the black matrix 121 and the color filter layer 130. The second substrate 200 includes a second base 230, a plurality of data lines 220 disposed on the second base 230, and a plurality of pixel electrodes 210 that are disposed on the second base 230 corresponding to the color filters of the plurality of color filter layers 130. The common electrode layer 140 is provided with an opening 141 at a position corresponding to the top of the color filter layer 130, where this position corresponds to the overlapping area of the black matrix 121 and the color filter layer 130 in the direction of the data line 220.

In the process of forming the common electrode layer 140 in the present application, an opening 141 is provided in the common electrode layer 140 at a position opposite to the color filter layer 130. Thus, when the common electrode layer 140 is being formed, the gas and water vapor produced by the color filter layer 130 may be released immediately through the opening 141 and so are not easy to accumulate between the common electrode layer 140 and the color filter layer 130. It is worth noting that, because the gas and water vapor are generated by the decomposition of the color filter layer 130, while the common electrode layer 140 is laid and attached to the color filter layer 130, and the opening 141 in the common electrode layer 140 needs to be provided at the position opposite to the color filter layer 130, in order that the gas and water vapor are effectively released through the opening 141.

Figure 8:
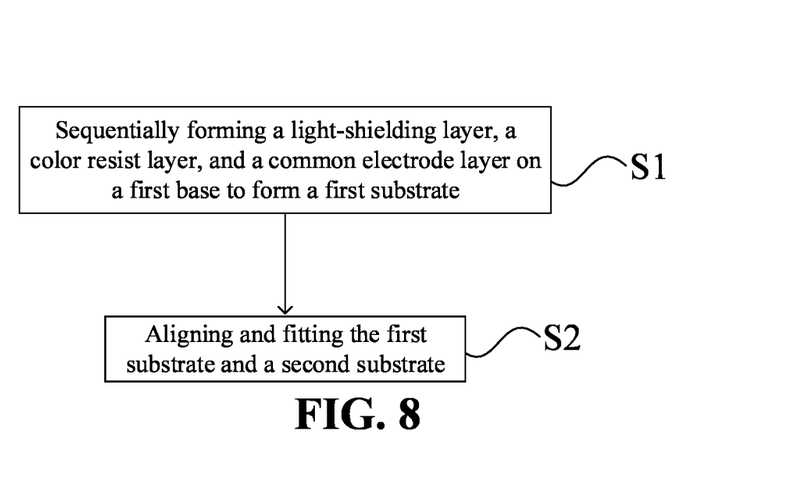
FIG. 8 is a schematic flowchart of a manufacturing method of a display panel according to another embodiment of the present application.

As another embodiment of the present application, a manufacturing method of a display panel is further disclosed, and is applied to the above-mentioned display panel. The manufacturing method includes the following operations S1 and S2 as illustrated in FIG. 8.

S1: sequentially forming a light-shielding layer, a color filter layer, and a common electrode layer on a first base to form a first substrate; and S2: aligning and fitting the first substrate with a second substrate;

In forming the common electrode layer on the first base, the common electrode layer may be etched at a position opposite to the color filter layer using a photo mask to create an opening. In particular, the operation of creating the opening includes coating a photoresist on the common electrode layer, then creating the opening in the common electrode layer by exposing, developing, and etching. After the opening is created, the first substrate is annealed at a high temperature environment of 100 to 300° C.

In the step of S1, a light-shielding layer, the color filter layer and the common electrode layer may be formed by sequentially coating, exposing, and developing on the first substrate, thus forming the first substrate. Further, the forming of the color filter layer may include forming a red color filter layer, a green color filter layer, and a blue color filter layer. The common electrode layer may be formed by deposition, in particular, by physical vapor deposition.

It should be noted that the various steps defined in this solution are not to be construed as limiting the order in which these steps are performed, on the premise of not affecting the implementation of the specific solution. In other words, the steps written earlier may be performed first, or may also be performed later, or may even be performed simultaneously. As long as the solution is able to be implemented, they variations shall all be regarded as falling in the scope of protection of this application.

The technical solutions of this application may be widely used in various display panels, such as TN (Twisted Nematic) display panels, IPS (In-Plane Switching) display panels, VA (Vertical Alignment) 1) Display panel, MVA (Multi-Domain Vertical Alignment) display panels. Of course, the above solutions may also be applicable to other types of display panels.

The foregoing is merely a further detailed description of the present application in connection with some specific illustrative implementations, and it is to be construed as limiting the implementation of the present application to these implementations.

For those having ordinary skill in the technical field to which this application pertains, numerous simple deductions or substitutions may be made without departing from the concept of this application, which shall all be regarded as falling in the scope of protection of this application.

What is claimed is:

1. A display panel, comprising:
   a first substrate; and
   a second substrate, disposed opposite to the first substrate;
   wherein the first substrate comprises:
      a first base;
      a light-shielding layer, disposed on the first substrate;
      a color filter layer, disposed on the first substrate; and
      a common electrode layer, disposed on the light-shielding layer and the color filter layer;
      wherein the common electrode layer is provided with an opening at a position opposite to the color filter layer;
      wherein the common electrode layer is in direct contact with the color filter layer, and wherein the opening defined in the common electrode layer at the position opposite to the color filter layer is used to allow gases and water vapor produced by decomposition of the underlying color filter layer during a high-temperature annealing operation performed on the common electrode layer in a manufacturing process of the first substrate to be released;
      wherein the opening is provided in the common electrode layer at the position corresponding to a top of the color filter layer;
      wherein the opening is provided in the common electrode layer and corresponds to the middle position in the width direction of the top of the color filter layer; and
      wherein the opening provided in the common electrode layer spans from one-third point to two-thirds point of the width of the top of the color filter layer.

2. The display panel according to claim 1, wherein the second substrate comprises a plurality of pixel electrodes corresponding to the color filter layer, and wherein the openings are provided at a position corresponding to only one of every two adjacent pixel electrodes in the plurality of pixel electrodes.

3. The display panel according to claim 1, wherein a plurality of the openings are distributed at equal intervals.

4. The display panel according to claim 1, wherein the opening is circular in shape, and has a radius that lies in the range of 3 to 10 microns.

5. The display panel according to claim 4, wherein the opening has a radius of 5 microns.

6. The display panel according to claim 1, wherein the opening is rectangular in shape, and has an area that lies in the range of 28.3 to 314 square microns.

7. The display panel according to claim 1, wherein the first substrate is a color filter substrate, and the second substrate is an array substrate.

8. A display device, comprising a display panel, the display panel comprising:
   a first substrate; and
   a second substrate, disposed opposite to the first substrate;
   wherein the first substrate comprises:
     a first base;
     a light-shielding layer, disposed on the first substrate;
     a color filter layer, disposed on the first substrate; and
     a common electrode layer, disposed on the light-shielding layer and the color filter layer;
   wherein the common electrode layer is provided with an opening at a position opposite to the color filter layer;
   wherein the common electrode layer is in direct contact with the color filter layer, and wherein the opening defined in the common electrode layer at the position opposite to the color filter layer is used to allow gases and water vapor produced by decomposition of the underlying color filter layer during a high-temperature annealing operation performed on the common electrode layer in a manufacturing process of the first substrate to be released;
   wherein the opening is provided in the common electrode layer at the position corresponding to a top of the color filter layer;
   wherein the opening is provided in the common electrode layer and corresponds to the middle position in the width direction of the top of the color filter layer; and
   wherein the opening provided in the common electrode layer spans from one-third point to two-thirds point of the width of the top of the color filter layer.

* * * * *